(12) United States Patent
Brown

(10) Patent No.: US 6,227,409 B1
(45) Date of Patent: May 8, 2001

(54) FLUID FLOW SYSTEM AND METHOD WITH SELECTIVE FLOW RATE MEASUREMENT

(75) Inventor: Ron L. Brown, Georgetown, TX (US)

(73) Assignee: Dresser Equipment Group, Inc., Carrollton, TX (US)

( * ) Notice: Subject to any disclaimer, the term of this patent is extended or adjusted under 35 U.S.C. 154(b) by 0 days.

(21) Appl. No.: 09/425,800

(22) Filed: Oct. 25, 1999

(51) Int. Cl.$^7$ .................................................. B67D 5/04
(52) U.S. Cl. ................................... 222/1; 222/52; 222/71
(58) Field of Search .................................. 222/1, 52, 63, 222/71, 72, 73

(56) References Cited

U.S. PATENT DOCUMENTS

| | | | |
|---|---|---|---|
| 4,397,405 | * | 8/1983 | Batson .............................. 222/71 X |
| 4,927,056 | * | 5/1990 | Glover ............................... 222/72 X |
| 5,139,045 | * | 8/1992 | Ensign ............................... 222/71 X |
| 5,275,189 | * | 1/1994 | Ensign ............................... 222/71 X |
| 5,363,988 | * | 11/1994 | Saxton et al. .................... 222/72 X |
| 5,433,342 | * | 7/1995 | Luro .................................. 222/71 X |
| 5,735,435 | * | 4/1998 | Kobayashi et al. ................... 222/63 |
| 5,794,667 | * | 8/1998 | Payne et al. ...................... 222/71 X |
| 5,868,179 | * | 2/1999 | Hartsell, Jr. ..................... 222/71 X |

* cited by examiner

Primary Examiner—Kenneth Bomberg
(74) Attorney, Agent, or Firm—Haynes and Boone, LLP

(57) ABSTRACT

A fluid flow system and method according to which fluid is pumped from a source through a conduit and a sensor senses the pressure of the fluid in the conduit. A meter is activated to measure the flow rate of the fluid when the fluid pressure in the conduit is relatively high, and is deactivated when the fluid pressure in the conduit is relatively low.

2 Claims, 2 Drawing Sheets

FLUID FLOW SYSTEM AND METHOD WITH SELECTIVE FLOW RATE MEASUREMENT

BACKGROUND

The present invention relates to a gasoline dispensing system and method and, more particularly, to such a system and method in which the flow rates of the fluid are selectively measured.

In fluid flow systems, such as gasoline services station installations, the gasoline is pumped from an underground storage tank, through a conduit, or tube, to a dispenser unit, and through a hose extending from the dispenser unit to a nozzle for dispensing the gasoline into a vehicle tank. A system valve is provided to control the gasoline flow, and a meter is connected in the system for metering the flow so that the volume of gasoline dispensed can be displayed on the dispenser unit and the customer charged accordingly. Ideally, during nonuse of the dispensing nozzle, gasoline will remain in the conduit between the storage tank and the dispensing unit and in the hose extending from the dispensing unit to the nozzle until the system valve and pump are turned on to pressurize the hose and permit the discharge of the gasoline through the nozzle. However, long periods of inaction, volumetric changes in the fuel due to temperature changes, and imperfect check valves in the system can cause some of the fluid in the conduit and the hose to leak back into the storage tank during non-use. Thus, when this happens and the pump is turned on and the valve is opened preparatory to dispensing the gasoline into a vehicle, a small volume of fuel will flow through the meter until the conduit and the hose are fully pressurized. Unfortunately, this volume of this fuel is often large enough to be metered and therefore displayed on the dispenser volume display. Since the dispensing nozzles are designed not to dispense gasoline when the pressure is below a certain limit, the meter will cause the register to display a dispensed volume of gasoline, even though no gasoline has actually been dispensed from the nozzle. This, of course, causes the customer to be charged for gasoline that is not actually dispensed.

Therefore, what is needed is a gasoline dispensing system and method that does not meter of display the flow of any gasoline in the system when none is being dispensed to the customer.

SUMMARY

The present invention provides a gasoline dispensing system and method according to which fluid is pumped from a source through a conduit, and a sensor senses the pressure of the fluid in the conduit. A meter is activated to measure the flow rate of the fluid when the fluid pressure in the conduit is relatively high and is therefore being dispensed, and is deactivated when the fluid pressure in the conduit is relatively low and the gasoline is therefore not being dispensed.

A major advantage is achieved with the system and method of the present invention since the system distinguishes between the flow of gasoline used to pressurize the hose and the flow of gasoline that is to be dispensed.

DETAILED DESCRIPTION

Figure 1:
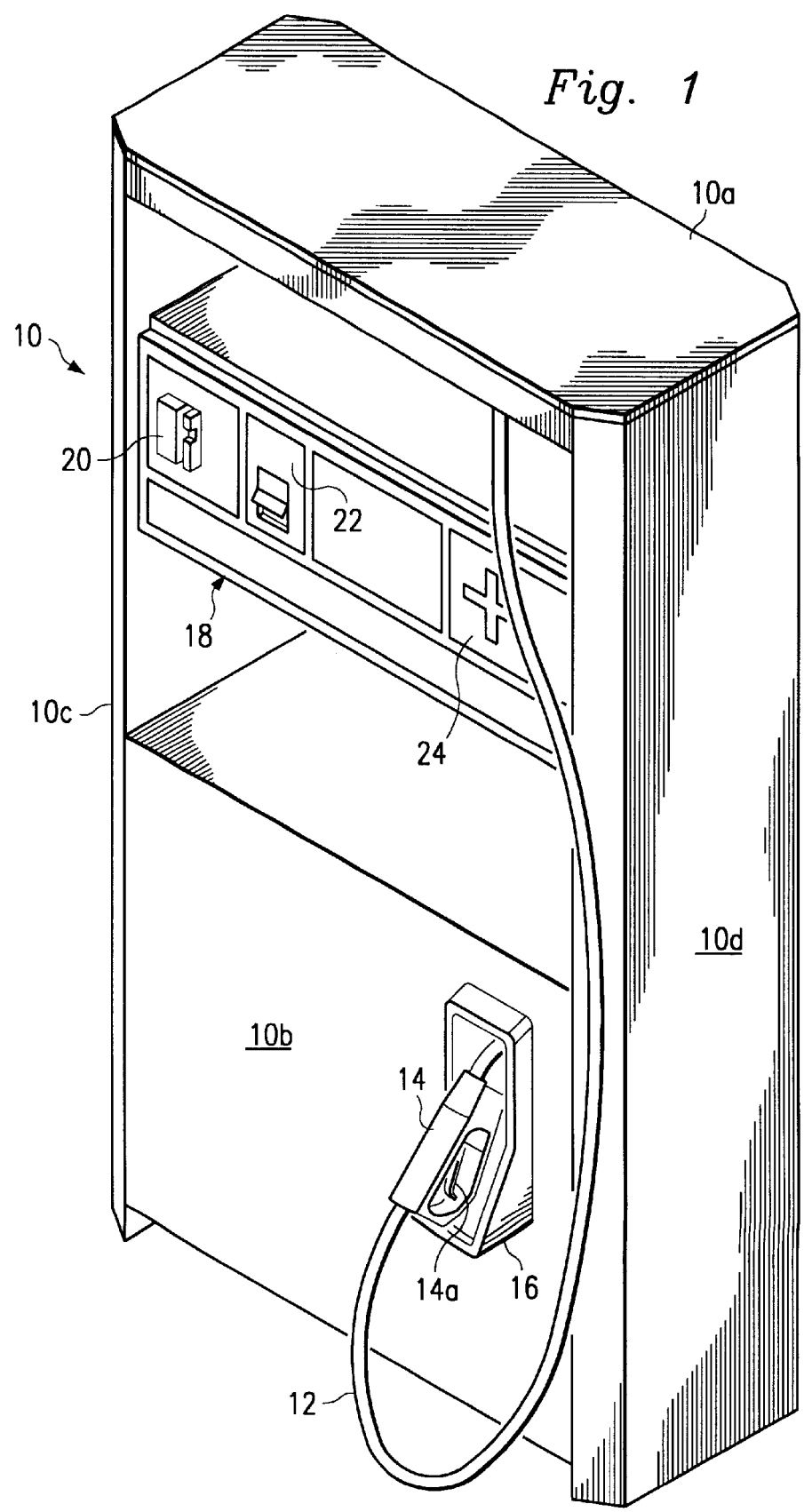
FIG. 1 is an isometric view of gasoline dispensing unit according to an embodiment of the present invention.

With reference to FIG. 1, the fluid flow system of an embodiment of the present invention will be described, by means of example, as a gasoline dispensing system for dispensing gasoline to vehicles at a service station, or the like. To this end, the reference numeral 10 refers, in general, to a dispenser unit having an upper housing 10a and a lower housing 10b connected by two spaced upright support members 10c and 10d.

Hydraulics are provided that include one or more conduits or tubes (not shown) connected to one or more underground tanks for storing the gasoline to be dispensed. These conduits extend from the lower housing 10b through one of the support members 10c and 10d to the upper housing 10a for passing gasoline to one end of a hose 12 which extends from the upper housing 10a. The other end of the hose 12 is connected to a nozzle 14 for dispensing gasoline from the storage tank to a vehicle. The nozzle 14 has a valve (not shown) that is normally closed but can be opened by a trigger, or lever, 14a that can be manually actuated in a conventional manner. Although not shown in the drawings, it is understood that the nozzle 14 includes an interlock that prevents the opening of the valve under relatively low pressure conditions as will be described. A boot 16 is provided on the front panel of the lower housing 10b for receiving the nozzle 14 during non-use.

An electronics housing 18 is provided between the upper housing 10a and the lower housing 10b, and contains various electronic components, including a credit card reader 20, a receipt dispenser 22, and a display 24 which displays the volume of gasoline dispensed and the cost of same. The respective fronts of the reader 20, the receipt dispenser 22, and the display 24 extend through the front panel, or bezel, of the housing 18.

Although not shown in the drawing, it is understood that a boot, identical to the boot 16, is provided on the opposite, or rear, panel of the housing 10b which receives a nozzle, identical to the nozzle 14, which extends from a hose identical to the hose 12. Also, the electronics housing 18 has a rear panel that receives a credit card reader, a receipt dispenser, and a display identical to the reader 20, the dispenser 22, and the display 24, respectively. Since all of this is conventional, it will not be described in further detail.

Figure 2:
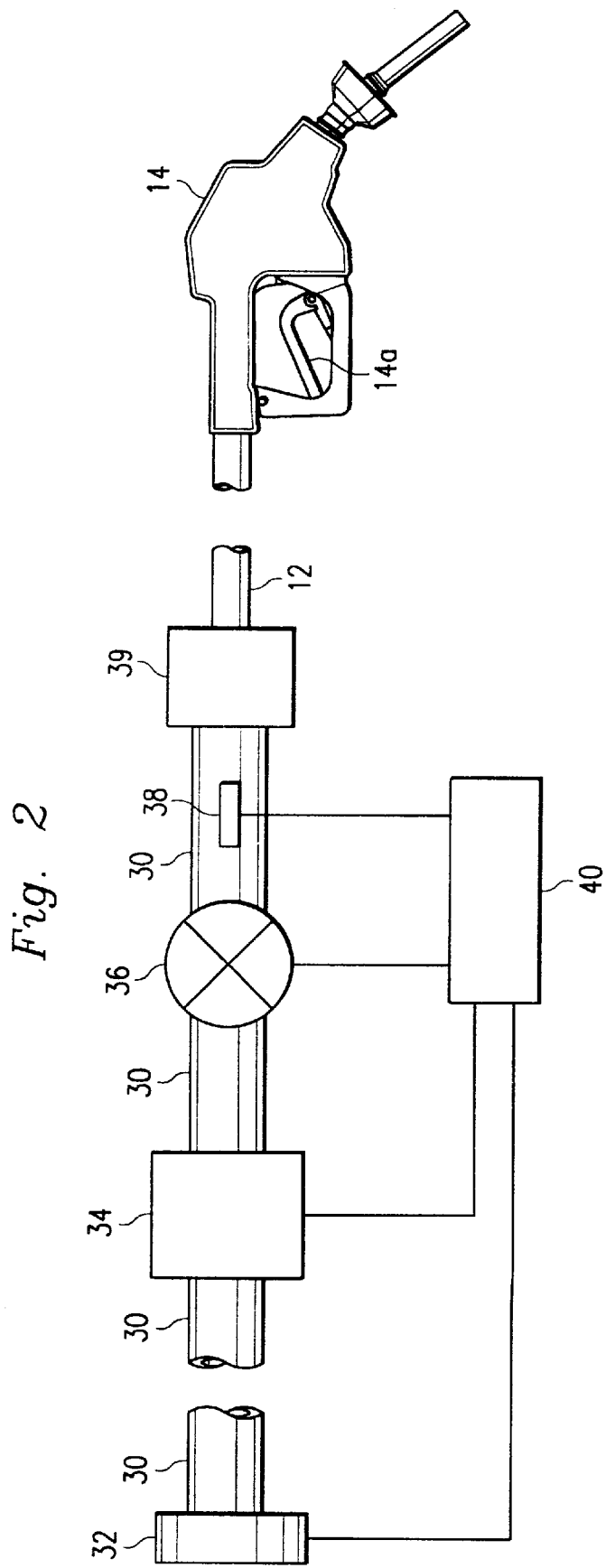
FIG. 2 is schematic view of the fluid flow system according to the embodiment of FIG. 1.

Referring to FIG. 2, one of the above-mentioned conduits extending from a storage tank (not shown) and through the dispenser unit 10 is referred to by the reference numeral 30. A pump 32 is provided at the storage tank and is connected to the conduit 30 for pumping the fuel from the storage tank, and a flow meter 34 is connected to the conduit 30 for metering the flow of the gasoline through the conduit. It is understood that the meter 34 is electrically connected to the display 24 (FIG. 1) for providing a display of the amount of gasoline dispensed and the cost of same, all in a conventional manner.

A flow control valve 36 is also connected to the conduit 30, preferably downstream of the meter 34, and operates in a conventional manner to control the flow of the gasoline through the conduit, and the amount that is dispensed into the vehicle tank under the additional control of the nozzle 14. A sensor 38 is provided in the conduit 30, preferably downstream of the valve 36, and functions in a conventional manner to sense the pressure of fluid in the conduit and generate a corresponding output signal.

The conduit 30 extends to a fitting, or adapter, 39 which permits the corresponding end of the conduit to be connected to the hose 12, and therefore to the nozzle 14, in fluid flow communication in a conventional manner.

The sections of the conduit 30 shown in FIG. 2, as well as the meter 34, the valve 36, and the sensor 38, are all located in the dispenser unit 10. The fitting 39 is preferably located on the lower portion of the upper housing 10a of the dispenser unit 10, and the hose 12 extends from the latter fitting and is in fluid flow communication with the conduit 30.

A control unit 40, preferably in the form of a computer, a microprocessor, a CPU, or the like, is provided and is electrically connected to the nozzle 14, pump 32, the meter 34, the valve 36 and the sensor 38. The control unit 40 receives input signals from the meter 34 and the sensor 38 corresponding to the fluid flow rate, and the fluid pressure, respectively, in the conduit 30. The control unit 40 also generates output signals based on the above input signals which output signals are used to start and stop the pump 32 and control the valve 36. The control unit 40 utilizes a software program that enables it to respond to the signals received from the meter 34 and the sensor 38 and regulate the valve 36 accordingly to stop, start, reduce, or increase the flow of the gasoline through the conduit 30, and therefore through the hose 12 and the nozzle 14.

In order to initiate operation of the dispenser unit 10, the customer activates a main system switch (not shown), in the form of a push button, a lever, or the like on the unit 10. This switch is connected to the control unit 40 which functions to start the pump 32 and open the valve 36. If there is a reduced volume of gasoline in the conduit 30 and the hose 12 for reasons indicated above, the pressure in the conduit will be relatively low. This low pressure condition will be sensed by the sensor 38 and a corresponding signal sent to the control unit 40 which, in turn, deactivates the meter 34. Also, the interlock on the nozzle 14 prevents the customer from opening the nozzle valve to dispense the gasoline.

As the pump 32 pumps additional gasoline into the conduit 30 and the hose 12, the pressure in the conduit 30 rises until the system is pressurized to a relatively high value. However, this flow will not be measured by the deactivated meter 34 until the pressure in the conduit 12 rises to a predetermined value consistent with the dispensing of the gasoline. When this occurs, the meter 34 is activated by the control unit 40 and the interlock on the nozzle 14 is released. Gasoline is thus pumped through the conduit 30, the hose 12 and to the nozzle 14 and the trigger 14a can be manually actuated for dispensing the gasoline into the vehicle. Of course, during this dispensing, the gasoline flow is measured by the meter 34 and a corresponding signal is sent to the control unit 40 and the display 24 for displaying the volume of gasoline that is dispensed.

The system thus distinguishes between the relatively low-pressure flow of gasoline used to pressurize the conduit 30 and the hose 12, and the relatively high-pressure flow for dispensing. Therefore, the system prevents premature metering of the gasoline, and a corresponding display of same, during the initial flow of the gasoline that pressurizes the conduit and the hose.

Of course, if multiple grades of fuel are provided in separate storage tanks, the number of conduits 30 extending from the tanks to the dispenser unit 10 would increase accordingly, the above system would be used with each conduit.

It is understood that variations may be made to the foregoing without departing from the scope of the invention. For example, although reference is made to "conduits" it is understood that pipes, tubes, hoses, lines and any other type of fluid flow device could be used within the scope of the invention. Also, the specific location of the various components discussed above that are connected to the conduit 30 can be varied within the scope of the invention. For example, the meter 32 can be located downstream of the valve 34 rather than upstream as shown in FIG. 2. Further, the spatial references, such as "upper" and "lower" are for the purpose of illustration only and do not limit the specific orientation or location of the structure described above. Still further, the system and method of the present invention are not limited to a gasoline dispensing system but are equally applicable to any fluid flow system.

It is understood that other variations, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A fluid flow method comprising the steps of pumping fluid from a source through a conduit, sensing the pressure of the fluid in the conduit, metering the flow rate of the fluid when the sensed fluid pressure in the conduit is at a relatively high value, displaying the metered flow during the step of metering, dispensing the fluid when the fluid pressure in the conduit is at a relatively high value, and preventing the step of metering when the sensed fluid pressure in the conduit is at a relatively low value to prevent the step of displaying when the fluid is not being dispensed.

2. The method of claim 1 further comprising the step of controlling the flow rate of the fluid.

* * * * *